United States Statutory Invention Registration [19]

[11] Reg. Number: H420

Yeager et al. [43] Published: Feb. 2, 1988

[54] CO-PYROLYSIS PROCESS FOR FORMING CARBONIZED COMPOSITE BODIES

[75] Inventors: Robert E. Yeager, Greenville; Earl L. Stone, III, Arlington, both of Tex.

[73] Assignee: The United States of America as represented by the Secretary of the Air Force, Washington, D.C.

[21] Appl. No.: 860,357

[22] Filed: May 6, 1986

[51] Int. Cl.[4] ..... C01B 31/00

[52] U.S. Cl. ..... 264/29.5; 264/29.7; 264/101

[58] Field of Search ..... 264/29.1, 29.2, 29.5, 264/29.7; 156/89

[56] References Cited

U.S. PATENT DOCUMENTS

| | | | |
|---|---|---|---|
| 2,875,503 | 3/1959 | Frickert et al. | 156/167 X |
| 3,552,533 | 1/1971 | Nitz et al. | 264/29.1 X |
| 3,700,535 | 10/1972 | McCoy et al. | 156/175 X |
| 3,728,423 | 4/1973 | Shaffer | 264/29.5 |
| 3,814,642 | 6/1974 | Araki et al. | 156/60 |
| 4,225,569 | 9/1980 | Matsui et al. | 264/29.1 X |
| 4,237,109 | 12/1980 | Hiramatsu et al. | 264/29.2 X |

*Primary Examiner*—Edward A. Miller
*Assistant Examiner*—J. E. Thomas
*Attorney, Agent, or Firm*—Charles E. Bricker; Donald J. Singer

[57] ABSTRACT

A co-pyrolysis process is disclosed for forming carbonized composite bodies in which co-pyrolysis of organic fibrous and matrix components is effected during initial pyrolysis. Improved interfacial bonding of composite bodies is achieved by combining fibrous precursors, or reinforcements with a controlled pre-shrink state, with an appropriate matrix to insure shrinkage matching during processing. Processing involves the heat treatment of an organic fibrous component, impregnation of the heat treated fibrous component with a resinous binder, forming a layup of the resin impregnated fibrous component, subjecting the layup to molding and curing cycles to form a laminate, pyrolysis of the laminate, and post-pyrolysis heat treatment of the pyrolized laminate.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CO-PYROLYSIS PROCESS FOR FORMING CARBONIZED COMPOSITE BODIES

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention relates generally to a co-pyrolysis process for forming carbonized composite bodies in which co-pyrolysis of organic fibrous and matrix components is effected during initial pyrolization. More particularly, the invention relates to a co-pyrolysis process for improving interfacial bonding of composite bodies by combining fibrous precursors, or reinforcements with a controlled pre-shrink state, with an appropriate matrix to insure shrinkage matching during processing.

2. Description of the Prior Art

Carbonized composite bodies, especially reinforced carbon-carbon composites, are subjected to many modern industrial applications, particularly in the fields of aerospace and aviation. As noted in U.S. Pat. No. 4,500,602, reinforced carbon-carbon composites that are generally constructed of fibers and bound by carbon matrix produce a material having excellent structural properties. The precursors for carbonaceous fibers are polyacrylonitrile, rayon, or pitch based fibers while the carbon-carbon impregnation materials are phenolic, furfuryl or pitch based materials. However, reinforced carbon-carbon composites are subject to degradation in high temperature oxygen environments unless, in accordance with the teachings of the aforesaid disclosure a protective coating is provided which comprises a first coating layer of silicon carbide and a second layer of sputtered zirconium oxide.

A method of fabricating carbon composites involving both resin and chemical vapor deposition (C.V.D.) steps is disclosed in U.S. Pat. No. 4,490,201 whereby a suitable carbonaceous binder, such as phenolic resin, polyimide resin, or a like material is applied in a limited amount to a partially carbonized fibrous material, such as polyacrylonitrile, wool, rayon, or pitch felt prior to pyrolization and C.V.D. of pyrolytic carbon densification steps. A major disadvantage of the C.V.D. method is that some form of expensive and bulky shaping fixture is required to hold the substrate materials in the desired configuration until sufficient pyrolytic carbon has been deposited to rigidize the fibrous structure.

Other patents of general interest are U.S. Pat. Nos. 4,234,650; 4,029,829; 3,991,248; 3,462,340; and 3,233,014.

SUMMARY OF THE INVENTION

The present invention provides a method for forming structural carbon-carbon composites with significantly improved interfacial bonding. Improvement of such interfacial bonding was achieved by combining fibrous precursors, or reinforcements with a controlled pre-shrink state, with an appropriate matrix to insure shrinkage matching during processing. Fibrous precursors that were subjected to a heat treatment process prior to an application of an appropriate matrix forming resinous component emitted fewer volatiles during subsequent pyrolysis. The flexure strength of bodies having pretreated fibrous precursors that were subject to a post-pyrolysis heat treatment process increased significantly to in excess of 50,000 psi eliminating the need for a densification process.

In summary, improved composites were produced by using a fibrous component along with an organic resinous binder. Briefly, the process comprises the heat treatment of the fibrous component, impregnation of the heat treated fibrous component with a resinous binder, forming plies of the resin impregnated fibrous component in a layup, subjecting the layup to molding and curing cycles to form a laminate, pyrolysis of the laminate, and a post-pyrolysis heat treatment of the pyrolized laminate.

It is therefore an object of the present invention to provide a co-pyrolysis process for forming structural carbon-carbon composite bodies of useful strength, structural integrity, and larger size than normally produced by prior art processes.

It is a further object of the invention to provide non-densified composite bodies of acceptable strength in comparison to other carbonization processes that utilize multiple densification steps.

Still another object of the invention is to provide a co-pyrolysis process for forming carbonized composite bodies with shorter processing time by omitting multiple re-impregnation and curing cycles.

Yet another object of the invention is to provide a co-pyrolysis process for forming carbonized composite bodies in which co-pyrolysis of organic fibrous and matrix components is effected during initial pyrolization.

Still a further object of the invention is to provide a co-pyrolysis process for forming carbonized composite bodies with significantly improved interfacial bonding.

Achievement of the above and other objects and advantages which will be apparent from a reading of the following disclosure and the overcoming of the shortcomings and disadvantages of the prior art processes have proceeded in the case of the present invention from the discovery by the present inventors that composite bodies with significantly improved interfacial bonding may be achieved by combining fibrous precursors, or reinforcements having a controlled pre-shrink state, with an appropriate matrix to insure shrinkage matching during processing and that composite bodies with significantly increased flexure strength may be achieved by heat treating pyrolyzed composites.

DESCRIPTION OF THE PREFERRED EMBODIMENTS

In accordance with an embodiment of the present invention, woven cloth of an organic fibrous material such as Kynol 2400 (a phenolic-based fiber sold by American Kynol, Inc., Altamonte Springs, Fla.), Pyron PW6 (a polyacrylonitrile fiber sold by Stackpole Fibers Company, Inc., Lowell, Mass.), and preferably VS-0050 (a pitch fiber sold by Union Carbide Co., Greenville, S.C.) woven into an 8-harness weave is subject to a pretreatment process that oxidizes and stablizes fiber surfaces. Generally, the process, which comprises an exposure of fibers in an oxidizing atmosphere to temperatures of about 260°-315° C., prevents the fibers from remelting during initial pyrolization and maintains fiber integrity.

Impregnation of the fibers with a resinous material is accomplished by immersing the cloth into resin-solvent admixture containing about 1 part resin such as BRP-5549 (a phenolic resin sold by Union Carbide Co., New York, N.Y.), K-700R (a furan resin sold by Fiberite Corp., Winona, Minn.), HA-43 (a polyphenylene resin sold by Hercules, Inc., Salt Lake City, Utah), and preferably K-640 (a phenolic resin sold by Fiberite Corp., Winona, Minn.) to 1 part solvent, such as isopropyl alcohol. The inclusion of the solvent in the resin-solvent admixture enhanced the even dispersal of the resin on the cloth. As the solvent evaporated, the viscosity of the resin increased.

Impregnated cloth was spread on a smooth surface, such as a plastic substrate, and allowed to air dry. The dried cloth was cut into the desired configuration and the plies were stacked one upon another, to form an uncured layup. For example, a stock of ten to twenty plies produced a layup about ⅛ to ¼ inch thick.

The layup was cured by subjecting it to a curing temperature and a molding pressure cycle of about 165° C. over a rise time of one hour and holding such temperature for an additional hour at a pressure of 15–80 psi (pounds per square inch) to form a cured laminate.

After the cured laminated part was packed in calcined coke in a retort, the retort was placed in a pyrolization furnace. The part was gradually brought up to pyrolization temperature of about 815° C. over an extended heating cycle which can vary in accordance with the materials and the number of plies for a particular part. Typically, a 72 hour cycle was employed, however, in some cases, longer periods, up to 14 days, were employed to obtain parts with somewhat greater physical integrity. Extended heating cycles were required for parts of larger size and greater number of laminations and to ensure slow rates of release of fiber and resin volatiles in order to prevent delamination of parts caused by excessively rapid volatile release.

Finally, the parts were heated to about 2000° C. for about 14 hours, held at about 2000° C. for about two additional hours, and gradually cooled by turning off furnace power.

Whereas organic fibrous precursors of multiple plies of woven cloth produced composites having two-dimensional strength characteristics, in another embodiment of the present invention an analogous process was employed to form elongated bodies with unidirectional fibers having enhanced longitudinal strength characteristics. The fibers were supplied in the form of roving yarn, such as Kynol KR-0204 (a phenolic-based fiber sold by American Kynol, Inc., Altamonte Springs, Fla.), Pyrol 30R (a polyacrylonitrile fiber sold by Stackpole Fibers Company, Inc., Lowell, Mass.), Grafil 0 (a polyacrylonitrile fiber sold by Courtaulds, Ltd., Coventry, England) and preferably VS-0050 and VS-0061 (pitch-based fibers sold by Union Carbide Company, Greenville, S.C.). The bodies are formed by the use of elongated, substantially bar shaped winding tools upon which a yarn or roving of organic fibrous material was wound longitudinally under tension.

Resin was applied to the fibers in a vacuum by pouring uncured resin over the layup. After removal from the vacuum chamber, the layup was dried, and then cured, pyrolyzed, and heat treated in accordance with the aforedescribed procedure yielding unidirectional bodies that are suitable for use as elongated elements. Parts produced from unistructural laminates are less porous then those produced from cloth laminates and exhibit flexure strength in excess of 50,000 psi.

In yet another embodiment of the present invention, the above-mentioned fibers were chopped into one-half inch lengths, fluffed in a blender at high speed, and spread over a flat surface to form a fibrous mat. The mat was impregnated with a resin-solvent admixture and dried. The layup was placed in a mold and cured at temperatures of about 165° C. in accordance with the aforedescribed procedure. The cured laminate was then pyrolyzed and heat treated. The mat laminates were formed as rectangular structures about ¼ inch in thickness, exhibiting good three-dimensional strength characteristics and flexure strengths of about 5,000 psi. In each of the embodiments of the present invention the use of pitch fibers, the heat pretreatment of fibers prior to resin application, and the heat treatment of pyrolyzed bodies was found to be most advantageous.

Futhermore, in every embodiment of the present invention the variables of prepregging, B-staging, cure conditions of time, temperature and mold pressure were found to be interrelated and to influence resin flow which affects density, porosity, and structural soundness of composites.

Prepregging includes the physical layup of fibers, resin content, method of applying resin to fibers, and method of drying. The general methods of prepregging mat, cloth, and unistructure laminates are similar but with differences in procedure. For mat laminate prepregging short pieces of fiber tow were fluffed in a blender and thoroughly mixed mechanically with the desired amount of resin-solvent admixture before being spread out to dry. For cloth laminate prepregging the desired amount of resin-solvent admixture was applied to cloth temporarily affixed to a base sheet to insure that the cloth was not pulled out of square during processing and then turned over several times to allow both sides to dry. For unistructure drum wound laminate prepregging the desired amount of resin-solvent admixture was applied onto fiber tow while being wound under tension around a drum in a tight helix so that adjacent wraps touched and then they were allowed to air dry. For unistructure tension wound laminate prepregging the desired amount of resin-solvent admixture was admitted into a vacuum desiccator to cover fiber tow wound under tension in successive layers onto a two bladded wheel followed by air drying.

B-staging was only required for the K-640 phenolic resin system and was carried out by placing the prepreg in a Blue M hot air oven for the required amount of time.

Mold pressure applied during cure was usually changed during the cure cycle which varied for each resin system. Included in some cure cycles at 80° C. and again at 100° C. for a predetermined amount of time there was a bump, an intentional momentary release of mold pressure to help release trapped cure gases. Generally, post cures performed under pressure were not completely successful except when much slower pyrolysis cycles effectively incorporated a post cure into the first stage of the pyrolysis cycle.

Pyrolysis and post-pyrolysis heat treatment of laminates was broken down into two or three successive cycles of temperature range and time. Major weight loss and shrinkage and most of the cracking and delaminations occurred with pyrolysis to 800° C. Heat treatments in excess of 1500° C. caused an increase in fiber strength and modulus of pyrolyzed laminates.

Densification of pyrolyzed or heat treated laminates involves reimpregnation with resin, cure, and repyrolysis. The process is used to help fill the extended open porosity developed during initial pyrolysis. It directly decreased porosity and increased density, strength, and modulus.

The pieces of equipment used for pyrolization were: an electric furnace made by K. H. Huppert Co., Type ST, Style 21 AHT, with a Barber-Coleman Cam Controller, Model 2040-25240; and an electric furnace made by Lindberg, box furnace Model 51662 and console Model 59554-S, capable of 1100° C. with inert gas retort, controlled by a microprocessor from Research Inc., MicRIcon Model 82300. Some cloth laminates were pyrolyzed in a fast 2 hour cycle in a Marshall tube furnace, Model 1442 made by Norton, Vacuum Equipment Div., but for slower cycles an electric furnace made by Sybron Corp., Thermolyne Type 1500, Model FDI520M-1, was used to 500°-600° C. followed by further pyrolysis to above 800° C. in the Huppert furnace. Heat treatments to 2000° C. in 16 hour cycles were run in an Astro 1000-3060 furnace made by Astro Industries, Inc., Santa Barbara, Calif.

The invention is illustrated by the following examples.

EXAMPLE I

A plurality of VS-0050 pitch fiber mat buttons pretreated either by exposure to an oxidizing atmosphere maintained at a temperature of 300° C. for 3 hours or at a temperature in excess of 400° C. were saturated with a 33–50% by wt. BRP-5549 resin-isopropyl alcohol admixture. The buttons were subjected to a cure cycle with a rise time of 40 minutes to 180° C. or a rise time of 140 minutes to 180° C. and cure pressures of 200–1000 psi. Some of the buttons were subjected to a postcure treatment of a 3 day cycle to 260° C., while others did not undergo any postcure treatment whatsoever. The buttons were then pyrolyzed using a 72 hour cycle to 816° C. Evaluation of the data indicated that (a) higher resin content and higher cure pressures produced denser, less porous laminates, but with more and worse cracks after pyrolysis, and (b) fiber prechar produced porous, less dense laminates.

EXAMPLE II

A plurality of VS-0050 pitch fiber mat laminates some of which were not pretreated while others were pretreated by exposure to an oxidizing atmosphere maintained at a temperature of 300°-315° C. for 3 hours were saturated with a 40–60% by wt BRP-5549 resin-isopropyl alcohol admixture or with a 40–50% by wt K-640 resin-isopropyl alcohol admixture. The laminates were sdbjected to a cure cycle with a rise time of 75 minutes to 150° C., or a rise time of 115 minutes to 175° C., or a rise time of 90 minutes to 160° C., or a rise time of 120 minutes to 163° C., or a rise time of 140 minutes to 163° C., and cure pressures of 30–1500 psi. Some of the laminates were subjected to a post cure treatment of a 3 day cycle to 260° C., while others did not undergo any post cure treatment whatsoever. The laminates were then pyrolized using a 72 hour cycle to 816° C., or a 374 hour cycle to 663° C., or a 240 hour cycle to 538° C. Some laminates were subjected to a post pyrolysis treatment of a 12 hour cycle to 2000° C., while some laminates were subjected to densification. Evaluation of the data indicated that (a) lower cure pressures produced porous laminates without cracks after pyrolysis but with lower flexure strength and modulus, (b) additional heat treatment produced laminates with increased flexure strength, and (c) densification produced laminates with less than expected improvement in flexure strength.

EXAMPLE III

A plurality of Grafil 0 fiber, or VS-0050 or VS-0061 pitch fiber mat composites some of which were prepyrolyzed using a 72 hour cycle to 816° C. while others were pretreated by exposure to an oxidizing atmosphere maintained at a temperature of 300° C. for 3 hours were saturated with a 40–50% by wt K-640 resin-isopropyl alcohol admixture or with a 50% by wt HA-43 resin-isopropyl alcohol admixture. The laminates were subjected to a cure cycle with a rise time of 120 minutes to 163° C., or a rise time of 140 minutes to 163° C., or a rise time of 40 minutes to 150° C. and cure pressures of 18–2000 psi. Some of the laminates were subjected to a post cure treatment of a 3 day cycle to 220° C., while others did not undergo any post cure treatment whatsoever. The laminates were then pyrolyzed using a 72 hour cycle to 816° C., or a 374 hour cycle to 663° C., or a 382 hour cycle to 820° C., or a 329 hour cycle to greater than 1100° C., or 365 hour cycle to 748° C. Some of the laminates were subjected to a post pyrolysis treatment of a 7 hour cycle to 1677° C., or a 12 hour cycle to 2000° C., or a 16 hour cycle to 2000° C. One of the VS-0050 pitch fiber composites was saturated with a 50% by wt K-640 resin and 5% by wt graphite powder-isopropyl alcohol admixture. Evaluation of the data indicated that (a) slower pyrolysis cycles reduced but did not eliminate blistering and spalling of Grafil-0 fiber laminates, (b) laminates of prepyrolyzed Grafil-0 fibers were porous after curing and after pyrolysis, (c) heat treatment of pyrolyzed Grafil-0 fiber laminates increased flexure strength, (d) intact pyrolyzed laminates exhibited significant strength increase with heat treatment, and (e) method used to mold mat laminates effected their bulk densities and flexural strength.

EXAMPLE IV

A plurality of Pyron PW6 fiber, or Kynol 2400 fiber cloth buttons pretreated by exposure to an oxidizing atmosphere maintained at a temperature of 300° C. for 3 hours, or pretreated by exposure to an oxidizing atmosphere maintained at a temperature of 206° C. for 5 hours, or charred at a temperature about 400° C. were saturated with a 30–60% by wt BRP-5549 resin-isopropyl alcohol admixture or with a 40% by wt K-640 resin-isopropyl alcohol admixture. The cloth buttons were subjected to a cure cycle with a rise time of 90 minutes to 130° C., or a rise time of 70 minutes to 150° C., or a rise time of 80 minutes to 150° C., or a rise time of 90 minutes to 180° C., or a rise time of 120 minutes to 180° C. and cure pressures of 200–1000 psi. The cloth buttons were then pyrolyzed using a 72 hour cycle to 816° C. Evaluation of the data indicated that (a) Pyron PW6 cloth buttons blistered and delaminated during prolysis, (b) Pyron PW6 fiber pretreated by charring produced low density, solid, intact cloth buttons, and (c) pretreated Kynol 2400 fiber produced satisfactory pyrolyzed buttons.

EXAMPLE V

A plurality of Pyron PW6 fiber, or Kynol 2400 fiber cloth swatch laminates some of which were not pretreated while others were pretreated by charring at 484°

C. were saturated with a 40–60% by wt K-640 resin-isopropyl alcohol admixture. The cloth laminates were subjected to a cure cycle with a rise time of 90 minutes to 160° C. and cure pressures of 16–400 psi. The cloth laminates were then pyrolyzed using a 72 hour cycle to 816° C., or a 2 hour cycle to 827° C. Evaluation of the data indicated that (a) Pyron cloth laminates subjected to the faster pyrolysis rate were slightly less dense, and (b) Pyron precharred fiber with higher resin content produced laminates that were denser as cured, but less dense after pyrolysis than previous swatch laminates.

EXAMPLE VI

A plurality of Pyron PW6 fiber, or Kynol 2400 fiber cloth laminates some of which were not pretreated while others were pretreated by exposure to an oxidizing atmosphere maintained at a temperature of 206°–318° C. for 5 hours, or by charring at 296°–437° C. were saturated with a 40–60% by wt K-640 resin-isopropyl alcohol admixture. The cloth laminates were subjected to a cure cycle with a rise time of 90 minutes to 160° C., or a rise time of 140 minutes to 163° C. and cure pressures of 15–30 psi. The cloth laminates were then pyrolyzed using a 72 hour cycle to 816° C. Some of the pyrolyzed cloth laminates were subjected to a densification process whereby the laminates were reimpregnated with K-640 resin admixture, recured, and repyrolyzed. Evaluation of the data indicated that (a) densification increased density, decreased porosity, and improved flexure strength of Pyron PW6 laminates, and (b) densification decreased flexure strength of Kynol 2400 laminates.

EXAMPLE VII

A plurality of Pyron PW6 fiber, or Kynol 2400 fiber cloth laminates some of which were not pretreated while others were pretreated by exposure to an oxidizing atmosphere maintained at a temperature of 260° C. for 5 hours. or by charring at 296°–437° C. were saturated with a 60% by wt K-640 resin-isopropyl alcohol admixture. The cloth laminates were subjected to a cure cycle with a rise time of 90 minutes to 160° C., or a rise time of 140 minutes to 163° C. and cure pressures of 30 psi. The cloth laminates were then pyrolyzed using a 72 hour cycle to 816° C. Some of the pyrolyzed cloth laminates were densified by reimpregnation with the K-640 resin admixture and repyrolyzed using a 15 hour cycle to 1016° C. Evaluation of the data indicated that (a) cure and pyrolysis densities of laminates increased, (b) densification increased density, decreased porosity, (c) densification slightly increased flexure strength, and (d) bulk densities were higher and apparent porosities were lower compared to laminates of Example VI.

EXAMPLE VIII

A plurality of VS-0050 pitch fiber cloth laminates pretreated by exposure to an oxidizing atmosphere maintained at a temperature of 300° C. for 3 hours were saturated with a 40–60% by wt K-640 resin-isopropyl alcohol admixture. The cloth laminates were subjected to a cure cycle with a rise time of 120 minutes to 163° C., or a rise time of 140 minutes to 163° C. and cure pressures of 18–400 psi. The cloth laminates were then pyrolyzed using a 72 hour cycle to 816° C., or a 240 hour cycle to 538° C., or a 382 hour cycle to 820° C., or a 329 hour cycle to greater than 1100° C. Some of the pyrolyzed cloth laminates were further heat treated using a 7 hour cycle to 1677° C., or a 12 hour cycle to 2000° C., or a 16 hour cycle to 2000° C. Evaluation of the data indicated that (a) heat treatment produced laminates with increased flexure strength and bulk density.

EXAMPLE IX

A plurality of VS-0050 pitch fiber cloth laminates pretreated by exposure to an oxidixing atmosphere maintained at a temperature of 300° C. for 3 hours were saturated with either a 40–50% by wt K-640 resin-isopropyl alcohol admixture, or a 40% by wt K-640 resin and 5% by wt graphite powder-isopropyl alcohol admixture, or 57% by wt K-700R resin-isopropyl alcohol admixture, or 50% by wt HA-43 resin-isopropyl alcohol admixture. The cloth laminates were subjected to a cure cycle with a rise time of 120 minutes to 163° C., or a rise time of 37 minutes to 150° C. and cure pressures of 18–80 psi. Some of the cloth laminates were then pyrolyzed using a 72 hour cycle to 816° C., or a 309 hour cycle to 850° C., or a 329 hour cycle to greater than 1100° C. Some of the pyrolyzed cloth laminates were further heat treated using a 16 hour cycle to 2000° C. Evaluation of the data indicated that flexure strength of the cloth laminates significantly increased with heat treatments. Some of the heat treated, pyrolyzed cloth laminates were densified by reimpregnation with 40% by wt. K-640 resin-isopropyl alcohol admixture and pyrolyzed using a 72 hour cycle to 816° C.; some of the once densified cloth laminates were again densified by reimpregnation with 50% by wt K-640 resin-isopropyl alcohol admixture and pyrolyzed using a 72 hour cycle to 816° C.; and some of the twice densified cloth laminates were again densified by reimpregnation with 50% by wt K-640 resin-isopropyl alcohol admixture. Evaluation of the data indicated that (a) flexure strength of the cloth laminates significantly increased with heat treatment and densification.

EXAMPLE X

A plurality of VS-0050 and VS-0061 pitch fiber unistructure yarn laminates pretreated by exposure to an oxidizing atmosphere maintained at a temperature of 300° C. for 3 hours were saturated with either 57% by wt. K-700R resin-isopropyl alcohol admixture or a 50% by wt. HA-43 resin-isopropyl alcohol admixture, or a 40% by wt. K-640 resin-isopropyl alcohol admixture. The unistructure yarn laminates were subjected to a cure cycle with a rise time of 120 minutes to 163° C., or a rise time of 37 minutes to 150° C. and cure pressures of 18–80 psi. The unistructure yarn laminates were then pyrolyzed using a 72 hour cycle to 816° C., or a 309 hour cycle to 850° C., or a 329 hour cycle to greater than 1100° C. The pyrolyzed yarn laminates were further heat treated using a 16 hour cycle to 2000° C. Evaluation of the data indicated that significantly high flexure strengths were obtained from the unistructure fiber laminates without densification. Evaluation of the data also indicated that flexure strength of the unistructure fiber laminates significantly increased with heat treatments.

While the within invention has been described as required by law in connection with certain preferred embodiments thereof, it is to be understood that the foregoing particularization and detail have been for the purposes of description and illustration only and do not in any way limit the scope of the invention as it is more precisely defined in the subjointed claims.

What is claimed is:

1. A method for forming structural carbon-carbon composites, which comprises:

pretreating an organic fibrous precursor by exposure for about three hours to an oxidizing atmosphere maintained at a temperature range of 260°-315° C.;

impregnating the fibrous precursor with a matrix-forming resinous binder admixed with a solvent material;

composing an assemblage of the resinous binder impregnated fibrous precursor cut to form a composite layup of predetermined configuration;

subjecting the composite layup to a curing temperature and molding pressure cycle of about 165° C. over a rise time of about one hour and a holding time of about one hour at a pressure range of 15-80 psi to form a cured laminate;

pyrolyzing the cured laminate in a pyrolization furnace by gradually raising the furnace temperature to about 815° C. over a heating cycle of 72-336 hours to form a pyrolyzed laminate; and heat treating the pyrolyzed laminate over a heating cycle of about 14 hours to a temperature of about 2000° C. and maintaining such temperature for about two additional hours followed by a gradual cooling of heat treated laminate to ambient temperature.

2. The method as recited in claim 1, wherein the organic fibrous precursor is selected from the group consisting of polyacrylonitrile, and phenolic.

3. The method as recited in claim 1, wherein the resinous binder is selected from the group consisting of polyphenylene resin, phenolic resin and furan resin.

4. The method as recited in claim 1, wherein the solvent material is selected from the group consisting of isopropyl alcohol and methyl ethyl ketone.

5. A method for forming structural carbon-carbon composites, which comprises:

pretreating woven cloth of organic fibrous material by exposure for about three hours to an oxidizing atmosphere maintained at a temperature range of 260°-315° C.;

impregnating the fibrous material with a matrix-forming resinous binder admixed with a solvent material;

composing one upon another a plurality of plies of the resinous binder impregnated fibrous material cut to form a composite layup of predetermined configuration;

subjecting the composite layup to a curing temperature and molding pressure cycle of about 165° C. over a rise time of about one hour and a holding time of about one hour at a pressure range of 15-80 psi to form a cured laminate;

pyrolyzing the cured laminate in a pyrolization furnace by gradually raising the furnace temperature to about 815° C. over a heating cycle of 72-336 hours to form a pyrolyzed laminate; and heat treating the pyrolyzed laminate over a heating cycle of about 14 hours to a temperature of about 2000° C. and maintaining such temperature for about two additional hours followed by a gradual cooling of the heat treated laminate to ambient temperature.

6. The method as recited in claim 5, wherein the organic fibrous material is preferably pitch fibers woven into cloth.

7. A method for forming structural carbon-carbon composites, which comprises:

pretreating organic fibrous material by exposure for about three hours to an oxidizing atmosphere maintained at a temperature of 260°-315° C.;

composing a layered mat of the fibrous material shaped to form a composite layup of predetermined configuration;

impregnating the composite layup with a matrix-forming resinous binder admixed with a solvent material;

subjecting the composite layup to a curing temperature and molding pressure cycle of about 180° C. over a rise time range of 40-140 minutes at a pressure range of 200-1000 psi to form a cured laminate;

pyrolyzing the cured laminate in a pyrolization furnace by gradually raising the furnace temperature to about 815° C. over a healing cycle of 72-382 hours to form a pyrolyzed laminate; and heat treating the pyrolyzed laminate over a heating cycle of about 14 hours to a temperature of about 2000° C. and maintaining such temperature for about two additional hours followed by a gradual cooling of the heat treated laminate to ambient temperature.

8. The method as recited in claim 7, wherein the layered mat consists of organic fibrous material chopped in one-half inch lengths and fluffed in a blender at high speed.

9. A method for forming structural carbon-carbon composites, which comprises:

pretreating elongated bodies of unidirectional organic fibrous material by exposure for about three hours to an oxidizing atmosphere maintained at a temperature range of 260°-315° C.; impregnating the fibrous material with a matrix-forming resinous binder admixed with a solvent material;

composing one upon another a plurality of plies of the resinous binder impregnated, parallel oriented fibrous material cut to form a composite layup of predetermined configuration;

subjecting the composite layup to a curing temperature and molding pressure cycle of about 165° C. over a rise time of about one hour and a holding time of about one hour at a pressure range of 15-80 psi to form a cured laminate;

pyrolyzing the cured laminate in a pyrolization furnace by gradually raising the furnace temperature to about 815° C. over a heating cycle of 72 hours to form a pyrolyzed laminate; and heat treating the pyrolyzed laminate over a heating cycle of about 14 hours to a temperature of about 2000° C. and maintaining such temperature for about two additional hours followed by a gradual cooling of the heat treated laminate to ambient temperature.

10. The method as recited in claim 9, wherein the elongated bodies of unidirectional organic fibrous material are wound under tension around a drum.

11. The method as recited in claim 9, wherein the elongated bodies of unidirectional organic fibrous material are wound under tension in successive layers onto a two bladed wheel.

12. The method as recited in claim 9, wherein the elongated bodies of unidirectional organic fibrous material are impregnated in a vacuum chamber with the matrix-forming resinous binder.

* * * * *